United States Patent

Semmelbeck et al.

Patent Number: 5,663,499
Date of Patent: Sep. 2, 1997

[54] METHOD FOR ESTIMATING PERMEABILITY FROM MULTI-ARRAY INDUCTION LOGS

[76] Inventors: Mark E. Semmelbeck, 600 Ivy Cove, College Station, Tex. 77845; John T. Dewan, 2216 Fulham Ct., Houston, Tex. 77063

[21] Appl. No.: 546,209

[22] Filed: Oct. 20, 1995

[51] Int. Cl.$^6$ ............................. F21B 49/00; G01V 1/00
[52] U.S. Cl. ........................ 73/152.06; 73/152.24; 73/152.46; 324/339; 324/323; 166/250.02; 175/40; 175/50; 175/58; 364/422; 364/571
[58] Field of Search ................. 73/152.02, 152.05, 73/152.06, 152.18, 152.24, 152.46; 324/339, 323, 333, 324; 166/250; 175/40, 58, 48, 50; 364/422, 571.02

[56] References Cited

U.S. PATENT DOCUMENTS

| | | | |
|---|---|---|---|
| 3,638,484 | 2/1972 | Tixier | 73/152 |
| 3,895,289 | 7/1975 | Rickey et al. | 324/1 |
| 3,946,604 | 3/1976 | Anderson | 73/152 |
| 4,233,839 | 11/1980 | Coates | 73/152 |
| 4,556,884 | 12/1985 | Howells et al. | 340/860 |
| 4,622,849 | 11/1986 | Fertl | 73/152 |
| 4,833,914 | 5/1989 | Rasmus | 73/152 |
| 5,349,528 | 9/1994 | Ruhovets | 364/422 |
| 5,379,216 | 1/1995 | Head | 364/422 |
| 5,446,654 | 8/1995 | Chemali et al. | 364/422 |
| 5,463,549 | 10/1995 | Dussan et al. | 364/422 |

OTHER PUBLICATIONS

*Mudcake Buildup and Invasion in Low Permeability Formations; Application to Permeability Determination by Measurement While Drilling;* John T. Dewan and Martin E. Chenevert; SPWLA 34th Annual Logging Symposium, Jun. 13–16, 1993; pp.1–24.

*The Effects of Mud Filtrate Invasion on the Interpretation of Induction Logs;* M.E. Semmelbeck and S.A. Holditch; SPE 14491: 1985; pp. 27–33 and figures.

*Primary Examiner*—Hezron E. Williams
*Assistant Examiner*—J. David Wiggins
*Attorney, Agent, or Firm*—Hill, Steadman & Simpson

[57] ABSTRACT

An improved method of estimating formation permeability is provided. Essentially, the improved method of the present invention combines a mud cake build-up/invasion model and a fully implicit near-well bore model from which radial formation resistivities can be computed and compared with log-observed values. The permeability used to compute the radial formation resistivities is varied until the computed radial formation resistivities match with the log-observed values. The improved method does not require core samples. Specifically, by using a multi-array induction log in combination with the porosity log, a petrophysical analysis of the formation is carried out and a calculated conductivity or resistivity log is provided. The calculated log values are compared with the measured log values obtained from the multi-array induction log. An automatic parameter estimation procedure is employed and the permeability, irreducible water saturation, residual gas saturation, capillary entrance pressure, and capillary correlation parameter values are adjusted in the petrophysical analysis until the calculated log values compare favorably with the measured log values. When the calculated values compare favorably with the measured log values, the permeability value is obtained.

9 Claims, 5 Drawing Sheets

Document the following information during drilling and circulation operations:

- Drilling depth
- Circulation rate
- Standpipe pressure
- Downhole assembly ID/OD
- Penetration rate
- Mud weight
- Mud additives
- Standard mud rheology data
- Mud solids content
- Chloride content of filtrate
- Trip and no-circulation time

↓ (1)

Catch mud samples downstream of shale shaker
- when penetrating target intervals
- when the mud system changes

Measure on each sample:
- solids content
- filtrate resistivity
- API fluid loss Store two 2-quart samples at each depth in labeled plastic bottles for dynamic/static mud tests

↓ (2, 3)

Clean and condition wellbore

↓ (4)

Run and QC logging suite including multiarray AIT-type induction log

↓

Review log and pick zones for PermLog analysis (5)

↓ (6)

Run DST or RFT in test zones to get initial pressure

↓ (7)

Perform detailed petrophysical evaluation of logs incorporating available core and offset well data

↓ (8)

Perform 4-point dynamic/static mud test as documented in Ref. 1

↓

Calculate wellbore pressure and eqilibrium invasion rate for the entire invasion period using the mud hydraulics information (9)

↓ (10)

Estimate gas gravity, critical gas saturation, - pore compressibility

↓ (11)

Establish constraints and initial values for all parameters that will be estimated by PermLog (12)

↓

Run Permlog software to estimate permeability and other parameters

DATA SOURCES

| Variable | Primary Source | Secondary Source |
|---|---|---|
| Reservoir pressure | RFT, DST [1] | |
| Water salinity | water analysis [1] | log analysis |
| Gas gravity | Gas chromatograph [1] | assume 0.65 |
| Gas impurities | Gas chromatograph [1] | assume none |
| Filtrate salinity | log header | |
| Well radius | log header, bit record | |
| Cementation factor (a) | assume a=1 | log analysis |
| Formation temperature | log analysis | |
| Cementation exponent | log analysis | |
| Saturation exponent | log analysis | |
| Shale resistivity | log analysis | |
| Porosity | log analysis | |
| Shale volume | log analysis | |
| Water saturation | log analysis | |
| Mud solids content | mud sample | |
| Cake compressibility exponent (v) | dynamic/static mud test | |
| Erosion factor | dynamic/static mud test | |
| Mudcake reference permeability $(k_{mco})$ | dynamic/static mud test | |
| Equilibrium invasion rate | mud test and circulation rate | |
| Wellbore pressure at zone | calculate from mud hydraulics | |
| Critical gas saturation | assume $S_{gc}$ 5% | core data |
| Pore compressibility | correlation [1] | assume $3.5 \times 10^{-6}$ |
| Capillary entrance pressure | log analysis/match parameter | |
| Irreducible water saturation | log analysis/match parameter | |
| Pore geometry exponent ($\lambda$) | log analysis/match parameter | |
| Residual gas saturation | log analysis/match parameter | |
| Permeability | match parameter | |

METHOD FOR ESTIMATING PERMEABILITY FROM MULTI-ARRAY INDUCTION LOGS

FIELD OF THE INVENTION

This invention relates generally to oil and gas exploration. More specifically, this invention relates to tools and methods for measuring formation permeability through the use of multi-array induction logs, drilling fluid data, drilling parameters and parameter estimation techniques. Still more specifically, the present invention provides an improved way for measuring formation permeability by combining a mud cake build-up simulation analysis with a near well-bore/reservoir simulation analysis.

BACKGROUND AND SUMMARY OF THE INVENTION

Permeability is an important parameter in the analysis of oil and gas reservoirs. Engineers need an accurate estimate of formation permeability in order to optimize the value of oil and gas reservoirs. The need for permeability data is acute in reservoirs with layers having different permeabilities. However, obtaining an accurate estimate of permeability in layered reservoirs has been always problematic for the following reasons.

First, the traditional methods of estimating permeability are based on either coring, log-core correlations or special well tests that require flowing the well and simultaneously measuring downhole rate and pressure. All of these methods are very expensive and normally require days to weeks for complete analysis. Good log-core correlations often require expensive special tests on cores from several wells. Methods based on less expensive side wall cores are notoriously inaccurate in low to moderate permeability formations.

Another method of measuring permeability is to perform time lapsed induction logging runs wherein mud filtrate invasion is monitored by repeated induction logging runs. This procedure is obviously costly in terms of rig time and logging costs.

The present invention is directed at an improved method for calculating formation permeability which does not require the retrieval of core samples or the performance of time lapsed logging runs. The present invention combines a mud cake build-up/invasion simulator or model with a fully implicit near-well bore/reservoir simulator or model, with which radial formation resistivities can be computed and compared with log-observed values. The estimated permeability is varied until a match between the computed radial formation resistivities and the log-observed values is achieved. The present invention specifically takes advantages of the new generation of multi-array induction tools which record five or more resistivity values as opposed to the traditional three resistivity values (i.e., the "short guard" or shallow measurement, the medium measurement and the "deep" measurement). The new generation of multi-array induction tools provides five resistivity measurements which will hereinafter be referred to $R_1$, $R_2$, $R_3$, $R_4$ and $R_5$ whereby $R_1$ is the shallow resistivity measurement, $R_5$ is the deepest resistivity measurement and $R_2$, $R_3$ and $R_4$ are radially spaced medium measurements disposed between $R_1$ and $R_5$. $R_1$ through $R_5$ all represent average resistivity (or conductivity) values throughout a radial zone. One multi-array induction log tool in current use is the Schumberger AIT™ log. It is also anticipated that competing logging companies will be introducing multi-array induction logging tools in the near future.

The invention is an improved method of calculating formation permeability using drilling parameters, drilling fluid, multi-array induction log data and sophisticated forward modeling techniques.

In summary, the time at which a zone of interest is penetrated by the drill bit is recorded. Subsequently, at appropriate time intervals up until the time of logging, the drilling parameters including the depth, bit size, mud circulation rate, outside diameter of the drill pipe, outside diameter of the collars and penetration rate of the drill string are recorded.

Once the zone of interest is penetrated, the drilling parameters are recorded and a mud sample is received downstream from the shale shaker. All changes in the drilling fluid or drilling mud are also recorded until the zone of interest is logged. New mud samples are retrieved in the event the drilling mud is changed. The time at which the multi-array induction log is run is also recorded along with the resistivity values. At least one porosity log is run with the induction log.

The filtration characteristics of the drilling fluid must be determined for input to the permeability estimation procedure. One preferred method of obtaining these characteristics is by conducting a test on the mud similar to that described by Dewan and Chenevert in a paper entitled "Mud Cake Buildup and Invasion in Low Permeability Formations; Application to Permeability Determination by Measurement While Drilling" (paper NN) which was presented at the SPWLA 34th Annual Logging Symposium, Jun. 13–16, 1993. The formation pressure may, be estimated from local knowledge, from an adjacent well, from a drill-stem test or a down-hole testing tool.

A petrophysical evaluation of all available log data is performed to estimate porosity, water saturation, water resistivity, cementation factor, formation temperature, cementation exponent, saturation exponent, shale volume, shale resistivity, capillary entrance pressure, irreducible water saturation, pore geometry exponent, residual gas saturation and other log-derived parameters and properties. The petrophysical evaluation is carried out by techniques known in the art and described below. The water saturation equation that is used in the petrophysical evaluation, such as Archie, Simandoux or dual-water, must also be used in the permeability analysis algorithm to ensure a consistent analysis.

In the petrophysical evaluation, the filtration equations of Dewan and Chenevert or other suitable filtration equations, the two phase immiscible fluid displacement equations for porous media and the dispersion equations for filtrate and formation water salinity distribution are simultaneously solved from the time the zone was penetrated until the time the multi-array induction logs were run. A radial distribution of water saturation and salinity around the bore hole at the time of logging is estimated and a radial resistivity distribution around the bore hole at the time of logging is calculated.

The calculated formation resistivity is used, along with the response function of each multi-array induction log, to calculate the values of resistivity that the logs would show under the computed (or "calculated") conditions. These calculated or synthetic logs are then compared to the measured logs.

Using methods of parameter estimation as set forth below in accordance with the present invention, the values of various model input parameters used in generating the calculated or synthetic logs (including permeability) are varied until the best possible statistical match of the measured log data and the calculated log data is obtained. The permeability of the free hydrocarbon phase (or free water phase in the case of a water-only zone) is thus estimated.

It is therefore an object to the present invention to provide an improved method for estimating permeability based on the use of the new generation multi-array induction logs.

Yet, another object to the present invention is to provide an improved method of estimating formation permeability without obtaining core samples.

Yet another object of the present invention is to provide an improved method of estimating formation permeability without using "time-lapse" induction logging runs.

Still another object to the present invention is to provide an improved computer software program for calculating formation permeability based upon the use of a multi-array induction log, a porosity log, drilling and drilling fluid parameters and automatic parameter estimation.

BRIEF DESCRIPTION OF THE DRAWINGS

The invention is partially illustrated in the accompanying drawings wherein.

It should be understood that details which are not necessary for an understanding of the present invention or which render other details difficult to perceive have been omitted. It should also be understood that the invention is not limited to the particular method illustrated herein.

DETAILED DESCRIPTION OF THE INVENTION

The zones of interest are identified from the mud logs or offset wireline logs and the drilling parameters and drilling fluid parameters are recorded versus time since penetration for each zone of interest. Then, a multi-array induction log in combination with the porosity log is run. The reservoir pressure may be tested by way of a drill-stem test or down-hole wire line tool as discussed above. In addition, adjacent well knowledge or local knowledge may be utilized to estimate formation pressure for the zone of interest.

A dynamic filtration test, such as the one described by Dewan and Chenevert, is conducted on the mud sample(s) and analyzed to obtain the reference porosity, reference permeability, equilibrium filtration rate, compressibility exponent, and erosion factor of the mud cake.

A detailed petrophysical analysis including the calculation of porosity, water saturation, clay content, clay conductivity, formation water resistivity, formation water saturation and cementation exponents is then carried out utilizing principles and equations known in the art.

Briefly, the petrophysical analysis is carried out as follows. Utilizing the following process and equations, the permeability and other parameters are estimated. The effects of gravity, tilting of the strata relative to the bore-hole, transfer of mass between phases (e.g., gas dissolving in the mud filtrate as invasion progresses), variations in water viscosity or compressibility due to variations in salinity are preferably ignored because these effects should be relatively negligible.

In equations (1) through (18) that appear below, the following nomenclature is used for the following constants or parameters:

| Nomenclature | | |
|---|---|---|
| a | = | cementation factor |
| B | = | formation volume factor |
| $c_g$ | = | gas compressibility |
| $c_p$ | = | pore compressibility |
| $c_w$ | = | water compressibility |
| $C_w$ | = | water salinity (salt concentration) |
| $E_a$ | = | active erosion factor |
| $E_f$ | = | mudcake erosion factor |
| h | = | net thickness |
| k | = | permeability |
| k | = | conductivity |
| $k_{mc}$ | = | mudcake permeability |
| $k_{mcr}$ | = | reference mudcake permeability |
| $k_{r1}$ | = | relative permeability to phase 1 |
| m | = | cementation exponent |
| n | = | saturation exponent |
| p | = | pressure |
| $P_{wellbore}$ | = | pressure in wellbore at formation depth |
| $\Delta P_{mc}$ | = | pressure drop across the mudcake |
| $P_c$ | = | capillary pressure |
| $P_{ce}$ | = | capillary entrance pressure |
| q | = | volumetric flow rate at standard T and p |
| $q_o$ | = | equilibrium filtration flow rate |
| $\dot{q}$ | = | specific flow rate |
| Q | = | flow rate across gridblock boundary |
| r | = | radius |
| $r_{mc}$ | = | inner radius of mudcake |
| $R_t$ | = | true formation resistivity |
| $R_w$ | = | formation water resistivity |
| $R_1$ | = | formation resistivity just beyond mudcake |
| $R_2$ | = | formation resistivity (intermediate - shallow) |
| $R_3$ | = | formation resistivity (intermediate - medium) |
| $R_4$ | = | formation resistivity (intermediate - deep) |
| $R_5$ | = | formation resistivity (deep) |
| s | = | solids content of mud |
| $S_g$ | = | gas saturation |
| $S_{grmx}$ | = | maximum residual gas saturation |
| $S_w$ | = | water saturation |
| $S_{wr}$ | = | irreducible water saturation |
| t | = | time |
| $\Delta t_{mc}$ | = | change in mudcake thickness |
| T | = | gridblock transmissibility |
| V | = | gridblock volume |
| $\vec{v}$ | = | velocity vector |
| $V_{sh}$ | = | shale volume |
| $\phi$ | = | porosity |
| $\phi_{mc}$ | = | mudcake porosity |
| $\mu$ | = | viscosity |
| $\rho$ | = | density |
| $\nu$ | = | pressure exponent in mudcake permeability relation |

| Subscripts | | |
|---|---|---|
| w | = | water |
| g | = | gas |
| r | = | residual or relative |
| mx | = | maximum |
| F | = | free |
| t | = | total |
| im | = | imbibition |
| dr | = | drainage |
| 1 | = | phase 1 |

-continued

| | | |
|---|---|---|
| i | = | gridblock index |
| mc | = | mudcake |
| sh | = | shale |
| obs | = | observed |
| mod | = | model |
| Superscripts | | |
| n | = | previous time level |
| n + 1 | = | current time level |
| * | = | normalized |
| up | = | upstream |

The basic formula of the continuity equation (one dimensional, in radial coordinates) is as follows:

$$\frac{-1}{rp^*} \frac{\partial(\rho r \bar{v})}{\partial r} = \frac{1}{\rho^*} \frac{\partial(\rho \phi)}{\partial t} + \hat{q} \quad (1)$$

Equation (1) can be rewritten for each flowing phase in a reservoir. The velocity of each phase is then calculated from the Darcy Flow Equation:

$$\bar{v}_l = -\frac{kk_{rl}}{\mu_l} \frac{\partial p_l}{\partial r} \quad (2)$$

The relative permeability parameter in Equation (2), $k_{rl}$, is a function of Saturation and thus will vary throughout the invasion process in regions where the water saturation is increasing. The phase velocity in Equation (2) is also dependent upon the phase pressure gradient. Two phase systems in porous media exhibit a difference in pressure between the two phases which is caused by a difference in the attractive surface forces, between each fluid and the rock (known as wettability). For gas-water systems, water is always assumed to be the wetting phase. Since water is more strongly attracted to rock than gases, the viscous pressure which causes fluid movement in the rock will be lower in the water phase than in the gas phase. The difference between the phase pressures at a given saturation is called the capillary pressure. The water phase pressure and the gas phase pressure are related through the capillary pressure by the following equation:

$$p_g = p_w + P_c \quad (3)$$

In the bore-hole, the gas phase pressure and the water phase pressure is the same (i.e., the capillary pressure is zero). Therefore any pressure differential into the formation caused by overbalance (hydrostatic head in the well bore greater than reservoir pressure) will be augmented for the water phase by the capillary pressure in the formation at the existing water saturation. Like relative permeability, the capillary pressure is dependent upon water saturation in properties of the rock. Because capillary pressure is normally obtained from core samples, the capillary pressure must be estimated, like absolute permeability. As shown below, absolute permeability, capillary entrance pressure and capillary pressure correlation parameter are all continuously estimated and re-estimated until the calculated resistivity values match the measured resistivity values as discussed below.

Returning to the Equations (1), (2) and (3), combining these equations gives the following two equations for water and gas:

$$\frac{1}{r} \frac{\partial}{\partial r} \frac{kk_{rw}r}{\mu_w B_w} \left( \frac{\partial p_w}{\partial r} \right) = \frac{\partial}{\partial t} \left( \frac{\phi S_w}{B_w} \right) + \hat{q}_w \quad (4)$$

$$\frac{1}{r} \frac{\partial}{\partial r} \frac{kk_{rw}r}{\mu_w B_w} \left( \frac{\partial p_w}{\partial r} + \frac{\partial P_c}{\partial t} \right) = \frac{\partial}{\partial t} \left( \frac{\phi S_g}{B_g} \right) + \hat{q}_g \quad (5)$$

These equations must be expanded in finite difference form because the saturation and pressure dependent coefficients rule out analytical solutions. First, the water equation is:

$$T_{w,i-\frac{1}{2}}(p_{w,i-1} - p_{w,i}) + T_{w,i+\frac{1}{2}}(p_{w,i+1} - p_{w,i}) = \quad (6)$$

$$\frac{V}{\Delta t} \left( \frac{\phi}{B_w} \right)^a [S_{w,i}^a (c_w + c_p)(p_{w,i}^{n+1} - p_{w,i}^n)(S_{w,i}^{n+1} - S_{w,i}^n)]$$

The equation for gas is similar:

$$T_{g,i-\frac{1}{2}}(p_{g,i-1} - p_{g,i}) + T_{g,i+\frac{1}{2}}(p_{g,i+1} - p_{g,i}) = \quad (7)$$

$$\frac{V}{\Delta t} \left( \frac{\phi}{B_w} \right)^a [S_{g,i}^a (c_g + c_p)(p_{g,i}^{n+1} - p_{g,i}^n)(S_{g,i}^{n+1} - S_{w,i}^n)]$$

The gas Equation (7) contains the gas phase pressure and saturation. When these equations are solved in the simulator of the software program of the present invention, the primary unknowns are pressure and saturation of the water phase. The capillary pressure relationship, see Equation (3), and the fact that gas and water saturations sum to unity are used to remove gas pressure and saturation from the equations. All terms on the left side of Equations (6) and (7) are evaluated at the end of the time step which is denoted as the (n+1) time level.

Figure 1:
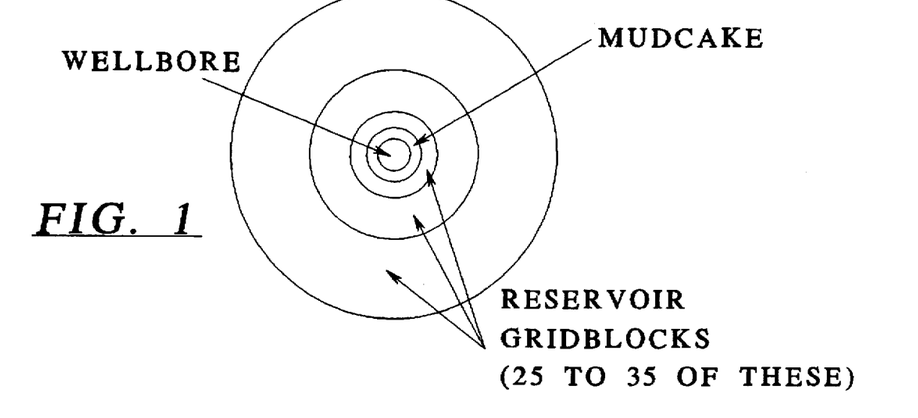
FIG. 1 is a top sectional view of reservoir with a bore-hole passing therethrough and further with the reservoir divided into three grid blocks.

$T_w$ and $T_g$ are the transmissibilities which are calculated for each grid block in the system. See FIG. 1. A typical application will divide the reservoir into thirty-five grid-blocks. The water transmissibility equation is provided below.

$$T_{w_{2-1/2}}(p_1 - p_2) + T_{w_{2+1/2}}(p_3 - p_2) = \frac{V_2 \Delta (\phi S_w/B_w)_2}{\Delta t} \quad (8)$$

$$\vdots$$

$$T_{w_{2-1/2}}(p_{n-1} - p_n) = \frac{V_n \Delta (\phi S_w/B_w)_n}{\Delta t}$$

Similarly, the transmissibility equation for gas is as follows:

$$T_{g_{1-1/2}}(p_{well} - p_1) + T_{g_{1+1/2}}(p_2 - p_1) = \frac{V_1 \Delta (\phi S_g/B_g)_1}{\Delta t} \quad (9)$$

$$\vdots$$

$$T_{g_{n-1/2}}(p_{n-1} - p_n) = \frac{V_n \Delta (\phi S_g/B_w)_n}{\Delta t}$$

The equations presented by Dewan and Chenevert to predict mud cake thickness and permeability may be utilized. Also, the equation for flow rate through a mud cake can be written in the following form assuming a cylindrical system rather than the linear system assumed by Dewan and Chenevert (although the results would be almost identical).

$$q_w = 0.007082 \frac{k_{mc}h}{B_w \mu_w \ln(r_w/r_{mc})} \Delta p_{mc} \quad (10)$$

In the first grid block, or the grid block adjacent to the bore hole, Equation (10) can be used to replace the first term in Equation (6). Also, the water phase at the first grid block (i=1), $p_{w,1}$ is the pressure at the formation "sand face" which is also the interface between the mud cake and the formation. Since we specify the well bore pressure (which we obtained from drilling conditions), $p_{w,1}$ can be replaced by $\Delta p_{mc}$ in the list of unknowns by the relation shown in Equation (11).

$$p_{w,1} = p_{wellbore} - \Delta p_{mc} \qquad (11)$$

The equation Dewan and Chenevert give for mud cake permeability is:

$$k_{mc} = \frac{k_{mco}}{\Delta p_{mc}^v} \qquad (12)$$

where $v$ is the mudcake pressure exponent and $k_{mco}$ is the mudcake reference permeability.

The mud cake thickness, $t_{mc}$ is equal to $(r_w - r_{mc})$. The change in mud cake thickness is calculated implicitly by the model in each time step by the following equation $$\Delta t_{mc} = 35.28 \frac{sr_w h}{1-s-\phi_{mc}} (q_{w,1} - q_e)E_a \Delta t \qquad (13)$$

where $q_e$ is the equilibrium invasion or filtration rate and $E_a$ is the active erosion factor which is 1 while the invasion rate is greater than the equilibrium rate and equal to the erosion factor, $E_f$, when the invasion rate is less than the equilibrium rate.

Equation (6) and (7) are solved for each grid block in the system, with appropriate substitution of Equations (10)–(13) using a Newton-Raphron iteration algorithm with line search.

The salinity distribution is determined implicitly after the pressure and saturation solution converges. The water flow rate across each grid block boundary is known from the following pressure-saturation solution:

$$Q_{w,i+1/2} = T_{w,i+1/2}(p_{w,i+1} - p_{w,i}) \qquad (14)$$

The flow rates across each grid block boundary can now be used to calculate the convected transport of salt due to the invasion by a filtrate with a different salinity than the formation water. Diffusional spreading of the interface between the filtrate and formation water is neglected. The complete displacement of formation water by filtrate is also assumed. However, it is also assumed that whatever fluid invades a gridblock during a given time step, that fluid is spread uniformly over the gridblock before the next time step. This leads to an invasion profile which is more realistic than a sudden step profile. With the above assumptions in mind, the following equation for the convective transport of salt in the formation is provided:

$$Q_{w,i-\frac{1}{2}}C_{w,i(i-1)}^{wp} + Q_{w,i+\frac{1}{2}}C_{w,i(i+1)}^{wp} = \qquad (15)$$
$$\frac{V}{\Delta t}\left[\left(\frac{\phi S_w C_w}{B_w}\right)_i^{n+1} - \left(\frac{\phi S_w C_w}{B_w}\right)_i^n\right]$$

Formation conductivity is calculated from either an Archie equation (16) for clean zones or a modified Simandoux equation (17) for shaley zones. These equations, solved for formation conductivity ($K_t$), are as follows:

(Archie)
$$K_t = \frac{\phi^m \kappa_w}{a} S_w^n \qquad (16)$$

(Modified Simandoux)
$$K_t = \frac{\phi^m \kappa_w}{a(1-V_{sh})} S_w^n + V_{sh}\kappa_{sh}S_w \qquad (17)$$

The above equations are used to calculate formation conductivity at each radial grid block in the simulator. The water saturation comes straight from the simulation. The water salinity calculated by the model is used to calculate the water resistivity, which varies radially. Other conductivity models can be used. The primary concern is to ensure consistency between the conductivity model used in the petrophysical analysis for determination of the parameters and the conductivity model used to calculate the resistivity distribution. In other words, it is important that the same water saturation model be used in the petrophysical analysis that is used to back calculate formation permeability from the inductions log data.

Once the resistivity or conductivity distribution about the well bore is calculated, as a final step in the petrophysical evaluation, the synthetic log resistivity values are calculated. The radial response functions, $g_r$, are used to calculate log resistivities. The integral equation relating the conductivity distribution to the log measurement of electrical conductivity is as follows:

$$\kappa_{log} = \int_o^\infty k_r \beta_r dr. \qquad (18)$$

Numerical integration is used to evaluate the log conductivities.

There are two significant advantages of the multi-array induction logs over the previous log combinations. First, the vertical resolution of the five measured logs are very closely matched to one another. Therefore, the invasion affects on each log should be representative of the radial resistivity profile over the same vertical section for each log. Also, the ratios of the different logs are more meaningful than the old dual induction ratios since each measurement is representative of the same vertical section.

Second, the peak positions of radial response functions are essentially independent of formation conductivity. This simplifies the deconvolution and forward modeling of these logs.

Finally, and most important in terms of the contribution provided by the present invention, the logs, i.e., the predicted conductivities from Equation (18), are compared with the measured conductivities from the logs. If the match is not acceptable, certain model parameters are varied in an attempt to achieve an acceptable match. The systematic match of perturbing the model parameters to obtain a match of the data and, therefore, an estimate of the parameters themselves is called automatic parameter estimation. Additional discussion of this concept can be found in the article written by the inventors entitled "Invasion-Based Method For Estimating Permeability Logs" which was presented at the 1995 SPE ATC & E meeting in Dallas, Tex. The parameters used for the automatic parameter estimation include permeability, irreducible water saturation, residual gas saturation and capillary pressure correlation parameter (also known as pore size distribution parameter). In the preferred method, the Levenburg-Marquardt method is used to solved the parameter estimation problem.

Figure 2:
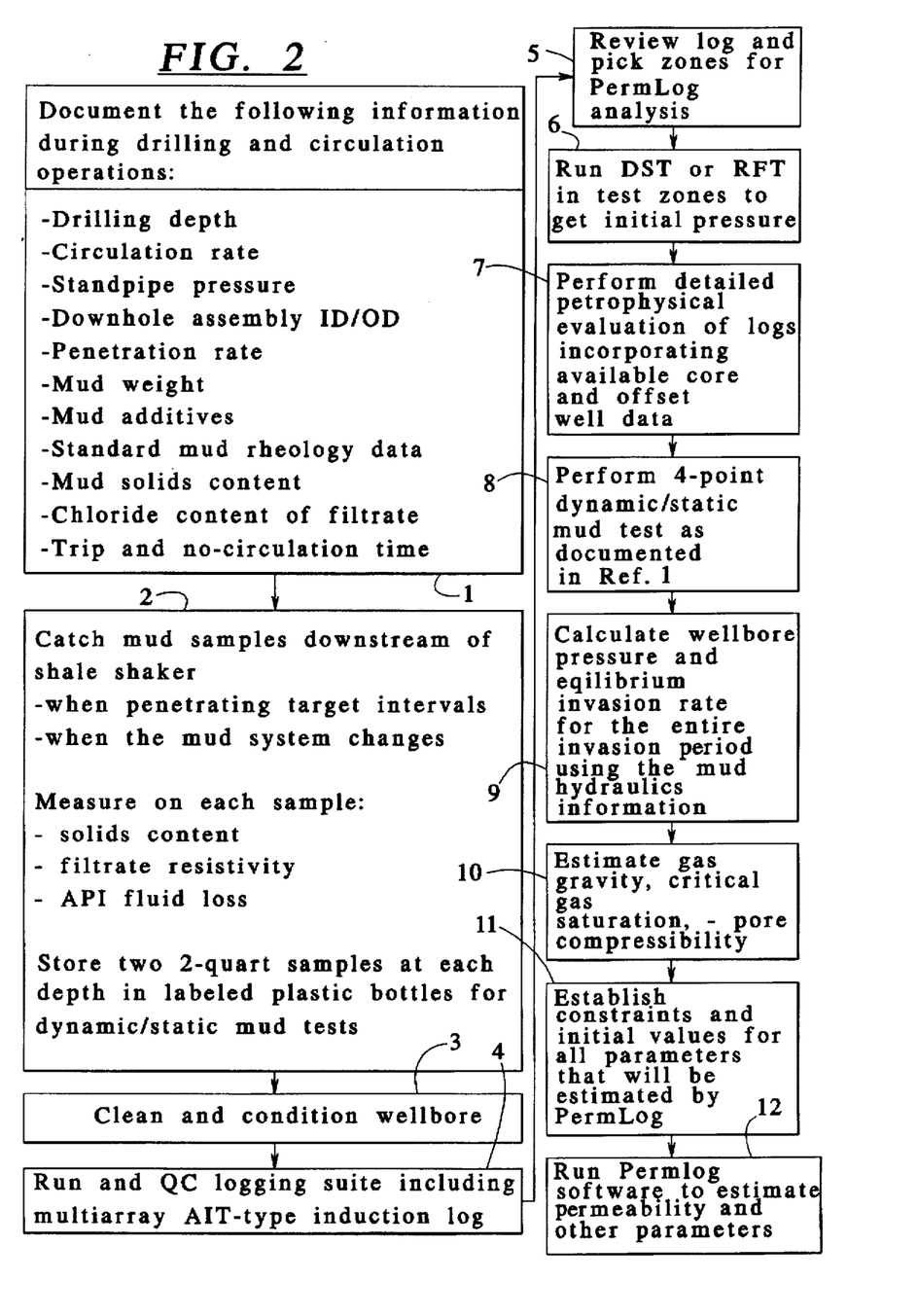
FIG. 2 is a flow chart illustrating a method of estimating permeability in accordance with the present invention.

FIG. 2 is a flow chart illustrating the overall procedure conducted at the well sight for estimating permeability in accordance with the present invention. In step 1, all of the drilling parameters are carefully recorded. In step 2, mud samples are taken downstream of the shale shaker for each zone of interest. The solids content (percentage of clay, shale, etc.), mud filtrate resistivity and API fluid loss are recorded for each mud sample. Two quart samples for each mud sample for the zones of interest should be stored for the dynamic/static mud test shown in, step 8 which is used to determine the parameters in Equations (12) and (13) discussed above. Next, the bore hole should be cleaned and conditioned (step 3) before the multi-array induction log/porosity log suite is performed in step 4.

In step 5, the operators confirm zones of interest for which a permeability analysis is desired. At this point, in step 6, a drill stem test or down hole pressure testing tool may be employed to obtain a reservoir pressure. In the alternative, the pressures of an adjacent well or local knowledge may also be used for reservoir pressure.

In step 7, the detailed petrophysical evaluation discussed above is performed. In steps 8 and 9, the dynamic/static mud test as illustrated by Dewan and Chenevert is carried out and the well bore pressure and equilibrium invasion rate for the time period starting when the zone of interest was penetrated to the time the zone was logged is calculated. In step 10, the gas gravity, critical gas saturation and pore compressibility is estimated. In step 11, using the Archie, Simandoux (modified) or dual-water model Equations, the formation conductivity for each radial grid block is calculated. In step 1, the calculated formation conductivity (or resistivity) is compared with the formation conductivity (or resistivity) measured by the multi-array induction log.

After the first set of calculations, the calculated values and measured values will normally be different. To make the calculated and measured values agree, the software or programmed computer of the present invention will adjust the values for permeability, irreducible water saturation, residual gas saturation, capillary entrance pressure and capillary pressure correlation parameter used in the above calculations. Then, the calculations are performed repeatedly with varying values of permeability and certain other parameters until the calculated values and measured values substantially agree.

Figure 3:
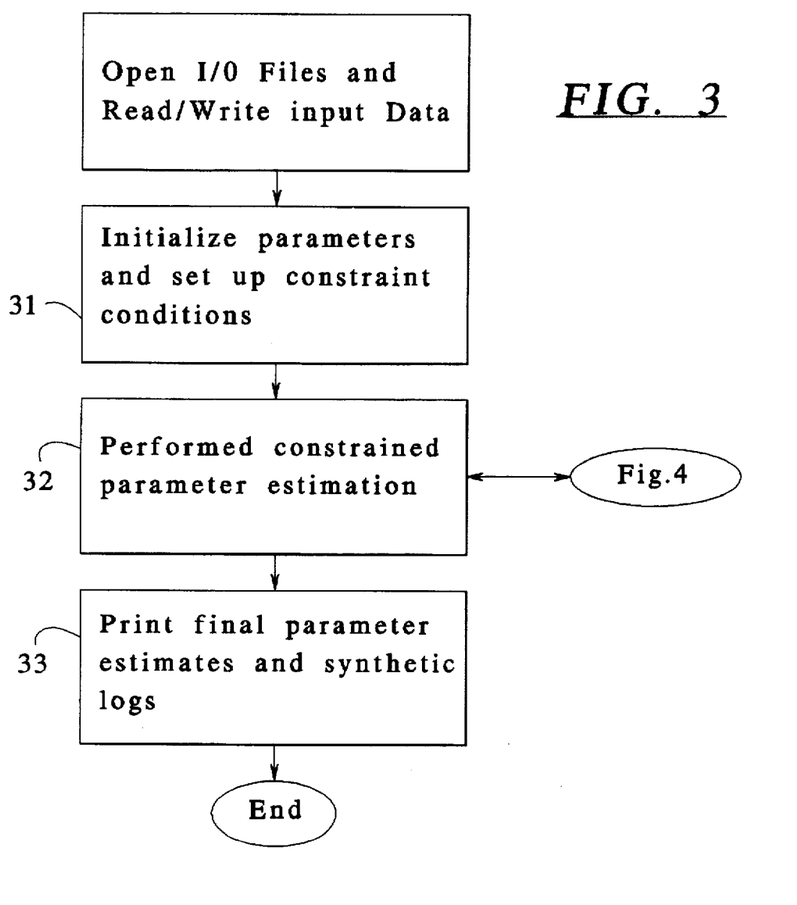
FIG. 3 is a flow chart illustrating the method carried out by the computer program of the present invention for estimating permeability.

Turning to FIG. 3, a flow chart illustrating the broad operation of the software is provided. At step 31, the initial parameter estimates and conditions are entered including an estimated permeability, irreducible water saturation, residual gas saturation, capillary entrance pressure, capillary pressure correlation parameter and water saturation model. At step 32, using a number of estimations, the petrophysical calculations discussed above are performed. See also FIG. 4. After the comparisons with the measured log values and the recalculations are performed, the final parameter estimates and synthetic logs are generated at 33.

Figure 4:
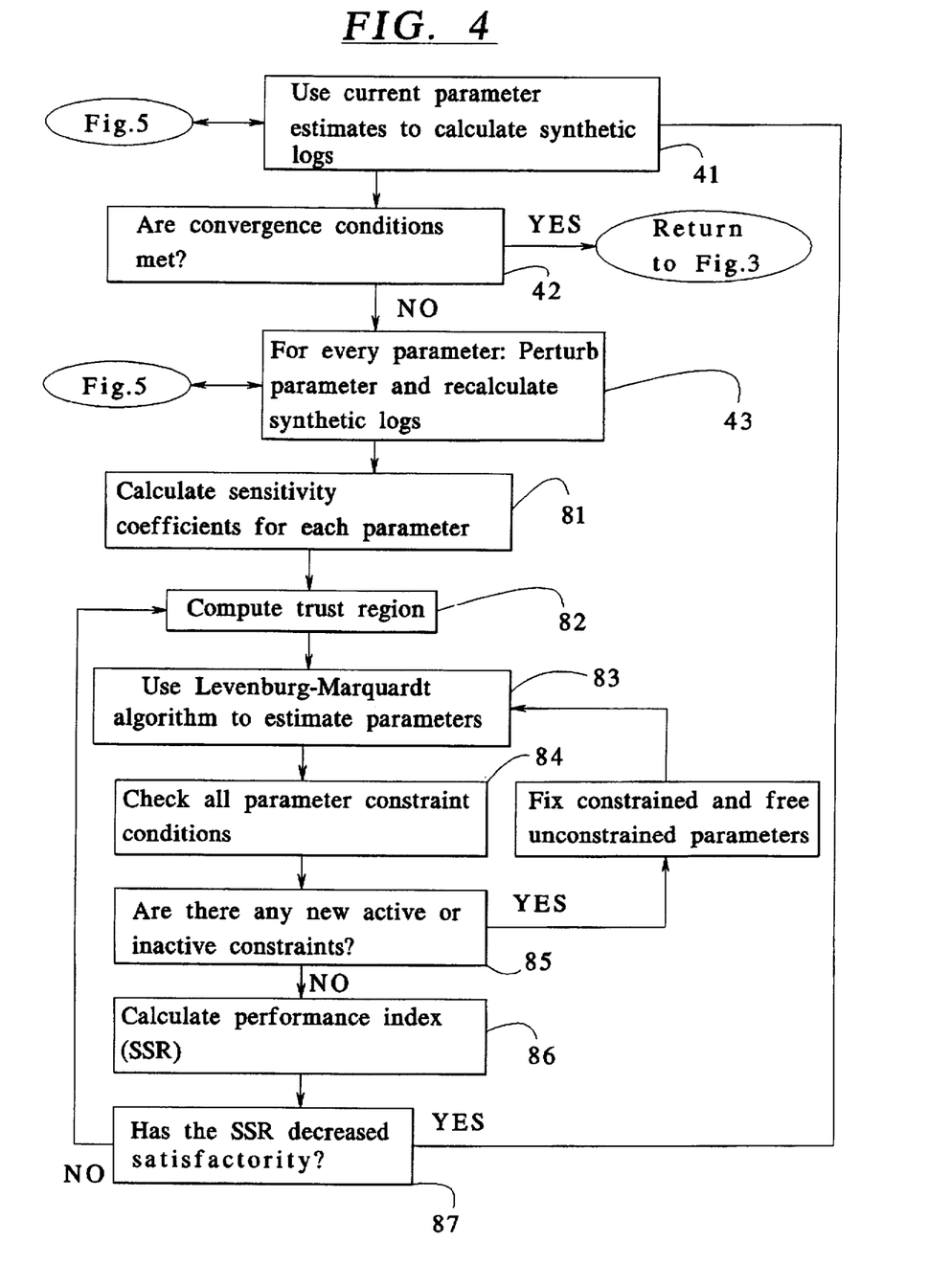
FIG. 4 is a flow chart method of constrained parameter estimation carried out by the computer program of the present invention.

Turning to FIG. 4, the automatic parameter estimation procedure of the software is illustrated by way of a flow chart. At step 41, an initial synthetic log is calculated by way of the petrophysical analysis discussed above. At step 42, the initial synthetic log is compared to the calculated log and if the convergence conditions are met, i.e. the synthetic and calculated logs substantially agree, the program returns to the flow chart illustrated in FIG. 3. Initially, of course, the synthetic and calculated values do not agree and the automatic parameter estimation must be carried out at steps 43 and 81–87.

Figure 5:
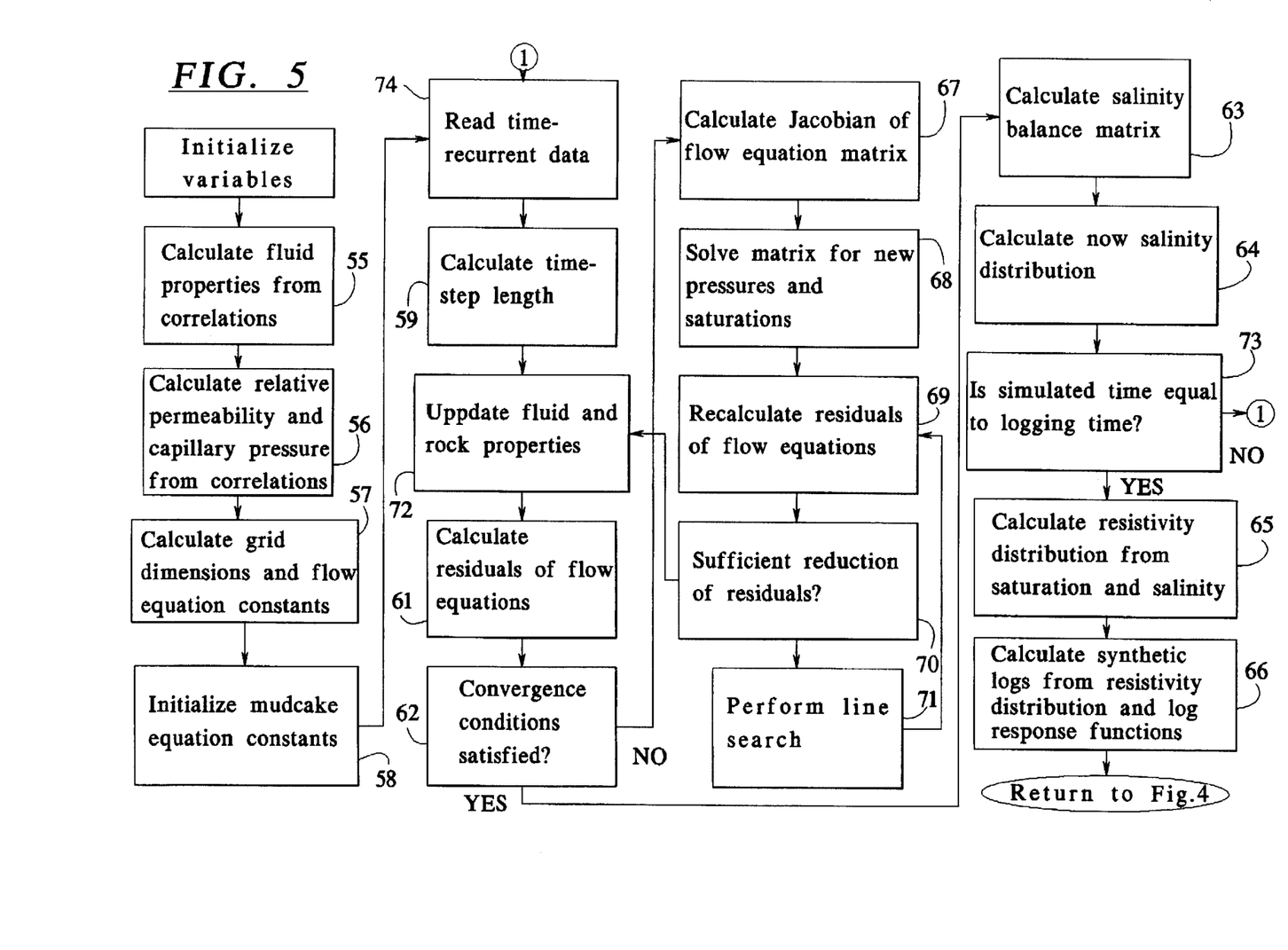
FIG. 5 is another flow chart illustrating the process for calculating synthetic log values by the computer program of the present invention.

Turning now to FIG. 5, the method for generating initial and perturbed parameters from the synthetic or calculated logs is illustrated. The initial parameter estimates utilized at step 41 in FIG. 4 are generated at steps 55–58 in FIG. 5. The simulation begins at step 59 with the calculation of the time-step length. At step 61, the residuals from the flow equations are generated from Equations (6) and (7) with appropriate substitutions of Equations (9)–(12). If the convergence conditions are satisfied at step 62, a synthetic log is calculated at steps 63–66 and the program returns to FIG. 4. If the convergence conditions are not satisfied at step 62, a line search algorithm is carried out at steps 67–71. During the line search algorithm procedure, the fluid and rock properties may be adjusted at step 70 and updated at step 72. Returning to the calculation of the synthetic logs at steps 63–66, a check performed at step 73 to determine whether the simulated time is equal to the logging time. If the two values do not agree, the entire procedure is restarted at step 74 and the time-step length is recalculated at step 59.

Returning to FIG. 4, the automatic parameter estimation is performed at steps 81–87. If the performance index or SSR has decreased satisfactorily at step 87 to indicate convergence of solution, the program returns to FIG. 5 for the re-calculation of the synthetic log (see step 41).

The method for calculating permeability provided by the present invention is relatively dependent upon formation "electrical" parameters and the specific resistivity model employed and more specifically to the following variables: formation water resistivity ($R_w$), porosity ($\phi$), cementation exponent (m), saturation exponent (n), and shale volume ($V_{sh}$). One way to reduce this dependence upon the aforenoted variables is to compare the observed and calculated resistivity ratios. For examples, the observed ratios for $R_1/R_5$, $R_2/R_5$, $R_3/R_5$ and $R_4/R_5$ are compared with the same calculated ratios. When a suitable "match" is achieved, the permeability can be back calculated as described above.

Figure 6:
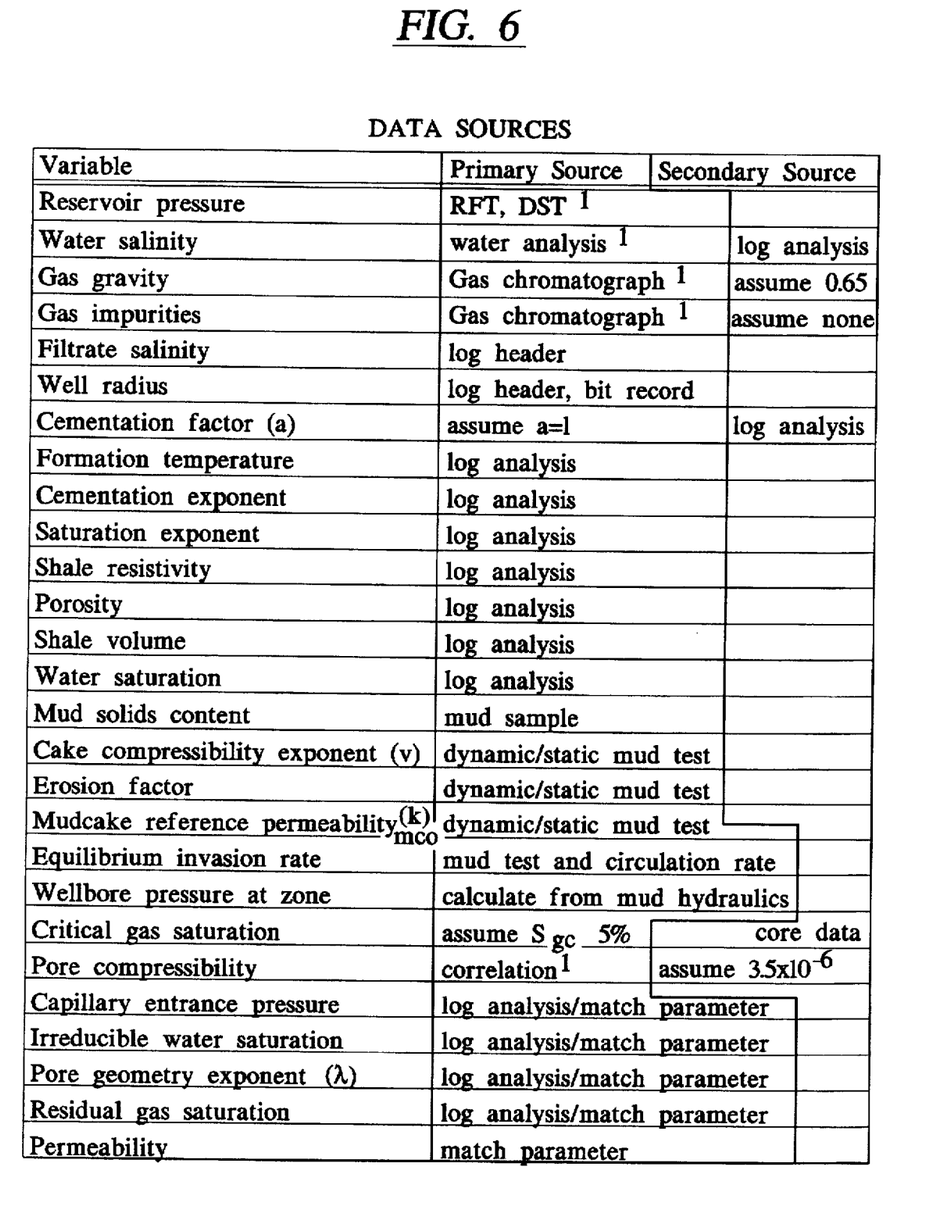
FIG. 6 is a chart of primary and secondary sources of data for the variables utilized by the computer program of the present invention.

Referring now to FIG. 6, the various sources of data is presented. With respect to the reservoir pressure, of course, adjacent well knowledge or local knowledge may also serve as an adequate substitute.

Although, only one primary method of carrying out the present invention has been illustrated and described, it will at once be apparent to those skilled in the art that variations may be made within the spirit and scope of the present invention. Accordingly, it is intended that the scope of the invention be limited solely by the scope of the hereafter appended claims and not by any specific wording in the foregoing description.

We claim:

1. A method of estimating the permeability of a zone of interest of a formation from drilling parameters, drilling fluid parameters, mud cake parameters and log data including multi-array induction log data taken with borehole drilling apparatus and sensor logging equipment in a borehole where re-circulated mud samples are retrieved downstream of a shale shaker, the method comprising the following steps performed for each zone of interest:

a. running an array-type induction log with at least five resistivity measurements and an appropriate porosity log and recording the time at which logs were run;

b. calculating porosity, water saturation, clay content, clay conductivity, formation water resistivity, formation water saturation and cementation exponents from the log data;

c. measuring dynamic properties of the mud cake including reference permeability, pressure exponent, mud cake porosity, equilibrium filtration rate and erosion factor;

d. simultaneously solving
the filtration equations of Dewan and Chenevert or similar or improved equations,
the two-phase immiscible fluid displacement equations for porous media, and
the dispersion equations for filtrate and formation water salinity distribution
from the time the zone of interest was penetrated until the time the array induction and porosity logs were run;

e. estimating the radial distribution of water saturation and salinity around the bore hole at the time of logging;

f. calculating the radial resistivity distribution around the bore hole at the time of logging;

g. comparing the measured array induction log resistivity values measured in step a with the resistivity distribution values calculated in step f;

h. determining the model parameters that minimize the differences between the resistivity values calculated in step e and the resistivity values measured in step a, the model parameters being selected from the group consisting of permeability, irreducible water saturation, residual gas saturation, capillary entrance pressure and capillary pressure correlation parameter;

i. repeating steps c through g until the calculated radial resistivity values calculated in step e substantially agree with the measured resistivity values measured in step a; and j. recording the formation permeability from step h.

2. The method of claim 1,
wherein conductivity values are calculated in steps a and f as opposed to resistivity values.

3. A method of estimating the permeability of a zone of interest of a formation from drilling parameters, drilling fluid parameters and log data, including multi-array induction log data taken with borehole drilling apparatus and sensor logging equipment in a borehole where re-circulated mud samples are retrieved downstream of a shale shaker, the drilling parameters including
drilling depth, mud circulation rate, standpipe pressure, bit size, OD of drill pipe and collars, length of drill collars, penetration rate of drill string, time periods of non-circulation, the time at which the zone of interest was penetrated, the drilling fluid parameters including
mud weight, mud additives, standard mud rheology data, chloride content of mud filtrate, mud filtrate resistivity and API fluid loss of the mud, the array induction log data including the time at which the log was run and at least five resistivity measurements of the formation reflecting five increasing radial distances from the bore hole, the five measurements including a shallow resistivity measurement $R_1$ which is a measurement of the formation resistivity just beyond the mud cake, a deep resistivity measurement $R_5$ which is a measurement of the formation resistivity beyond an area of mud filtrate invasion and at least three intermediate resistivity measurements $R_2$, $R_3$, and $R_4$ which are measurements of formation resistivity between $R_1$ and $R_5$, the method comprising the following steps performed for each zone of interest:

a. recording the drilling data;

b. retrieving mud samples of circulated mud taken downstream of the shale shaker;

c. recording any changes in the drilling fluid made from the time the zone is penetrated until the time the zone is logged;

d. retrieving and storing samples of circulated mud taken downstream of the shale shaker for any changes in the drilling fluid recorded in step c;

e. calculating mud cake parameters including reference permeability, pressure exponent, mud cake porosity, erosion factor and equilibrium filtration rate from static and dynamic filtration measurements made at the laboratory or at the well site;

f. running array induction log with at least five resistivity measurements and an appropriate porosity log and recording the time at which logs were run;

g. estimating formation pressure;

h. calculating porosity, water saturation, clay content, clay conductivity, formation water resistivity, formation water saturation and cementation exponents;

i. simultaneously solving
the filtration equations of Dewan and Chenevert,
the two-phase immiscible fluid displacement equations for porous media, and
the dispersion equations for filtrate and formation water salinity distribution
from the time the zone of interest was penetrated until the time the array induction logs were run;

j. estimating the radial distribution of water saturation and salinity around the bore hole at the time of logging;

k. calculating the radial resistivity distribution around the bore hole at the time of logging;

l. comparing the measured array induction log resistivity values measured in step f with the resistivity values calculated in step k;

m. determining the model parameters that minimize the differences between the resistivity values calculated in step k and the resistivity values measured in step f, the model parameters being selected from the group consisting of permeability, irreducible water saturation, residual gas saturation, capillary entrance pressure and capillary pressure correlation parameter;

n. repeating steps h through l until the calculated residual resistivity values calculated in step k substantially agree with the measured resistivity values measured in step f; and o. recording the formation permeability from step m.

4. The method of claim 3,
wherein the estimation of well pressure is obtained from a drill stem test.

5. The method of claim 3,
wherein the estimation of well pressure is obtained from a wireline tool.

6. The method of claim 3,
wherein the estimation of well pressure is obtained from local knowledge.

7. The method of claim 3,
wherein conductivity values are calculated in steps f and k as opposed to resistivity values.

8. A method of estimating the permeability of a zone of interest of a formation from drilling parameters, drilling fluid parameters and log data including multi-array induction log data, the method comprising the following steps performed for each zone of interest:

a. running array induction log with at least five resistivity measurements and an appropriate porosity log and recording the time at which logs were run;

b. calculating porosity, water saturation, clay content, clay conductivity, formation water resistivity, formation water saturation and cementation exponents from the log data;

c. calculating a synthetic radial resistivity distribution around the borehole at the time of logging from the porosity, water saturation, clay content, clay conductivity, formation water resistivity, formation water saturation and cementation exponents calculated in step b;

d. comparing the measured array induction log resistivity values measured in step a with the synthetic radial resistivity distribution values calculated in step c;

e. determining the model parameters that minimize the differences between the resistivity values calculated in step c with the resistivity values measured in step a, the model parameters being selected from the group consisting of permeability, irreducible water saturation, residual gas saturation, capillary entrance pressure and capillary pressure correlation parameter;

f. repeating steps c through e until the values calculated in step c substantially agree with the values measured in step a; and g. recording the formation permeability from step e.

9. A method of estimating the permeability of a zone of interest of a formation from drilling parameters, drilling fluid parameters, mud cake parameters and log data including multi-array induction log data taken with borehole drilling apparatus and sensor logging equipment in a borehole where re-circulated mud samples are retrieved downstream of a shale shaker, the method comprising the following steps performed for each zone of interest:

a. running an array-type induction log to obtain at least five radially spaced resistivity measurements including a shallow resistivity measurement ($R_1$), a deep resistivity measurement ($R_5$) and at least three radially spaced medium measurements ($R_2$, $R_3$ and $R_4$) disposed between $R_1$ and $R_5$, and an appropriate porosity log and recording the time at which logs were run;

b. generating at least four measured resistivity ratios including $R_1/R_5$, $R_2/R_5$, $R_3/R_5$ and $R_4/R_5$ based on the resistivity values measured in step a;

c. calculating porosity, water saturation, clay content, clay conductivity, formation water resistivity, formation water saturation and cementation exponents from the log data;

d. measuring dynamic properties of the mud cake including reference permeability, pressure exponent, mud cake porosity, equilibrium filtration rate and erosion factor;

e. simultaneously solving
    the filtration equations of Dewan and Chenevert or similar or improved equations,
    the two-phase immiscible fluid displacement equations for porous media, and
    the dispersion equations for filtrate and formation water salinity distribution from the time the zone of interest was penetrated until the time the array induction and porosity logs were run;

f. estimating the radial distribution of water saturation and salinity around the bore hole at the time of logging;

g. calculating resistivity values for the radial locations corresponding to $R_1$, $R_2$, $R_3$, $R_4$ and $R_5$ around the bore hole at the time of logging;

h. generating at least four calculated resistivity ratios including $R_1/R_5$, $R_2/R_5$, $R_3/R_5$ and $R_4/R_5$ based on the resistivity values calculated in step g;

i. determining the model parameters that minimize the differences between the calculated resistivity ratios generated in step h and the measured resistivity ratios generated in step b, the model parameters being selected from the group consisting of permeability, irreducible water saturation, residual gas saturation, capillary entrance pressure and capillary pressure correlation parameter;

j. repeating steps c through i until the calculated resistivity ratios generated in step h approach measured resistivity ratios generated in step b; and k. recording the formation permeability from step i.

* * * * *